United States Patent

[11] 3,573,761

[72] Inventor Richard M. Genke
Colts Neck, N.J.

[21] Appl. No. 709,131
[22] Filed Feb. 28, 1968
[45] Patented Apr. 6, 1971
[73] Assignee Interdata, Inc.
Oceanport, N.J.

[54] COINCIDENT CURRENT MAGNETIC CORE MEMORY MATRIX
16 Claims, 8 Drawing Figs.

[52] U.S. Cl. ........ 340/174
[51] Int. Cl. ........ G11c 5/02, G11c 11/06
[50] Field of Search ........ 340/174 (M)

[56] References Cited
OTHER REFERENCES

Publication I - Proceedings - Fall Joint Computer Conference - 1965, " High Speed 2 ½D Memory" by Gilligan & Persons, pp. 1011 to 1021.

*Primary Examiner*—James W. Moffitt
*Attorney*—Maleson, Kimmelman and Ratner

ABSTRACT: A coincident current magnetic core memory matrix of the 2½D-type having bit lines arranged in groups and a separate bit current driver is connected to one end of all the bit lines of a group. A plurality of pairs of conductors are provided equal in number with the number of bit lines in a group. Diodes connect another end of each bit line of a group to a differing one of the conductor pairs. There is provided for each pair of conductors bit switching means operable for connecting both conductors of a pair to a point of reference potential to complete a path for flow of bit current through the respective bit lines.

INVENTOR
RICHARD M. GENKE
BY
Maleson, Kimmelman & Ratner

INVENTOR
RICHARD M. GENKE
BY
Maleson, Kimmelman & Ratner
ATTORNEYS

INVENTOR
RICHARD M. GENKE
BY
Maleson, Kimmelman & Ratner
ATTORNEYS

INVENTOR
RICHARD M. GENKE
BY
Maleson, Kimmelman & Ratner
ATTORNEYS

COINCIDENT CURRENT MAGNETIC CORE MEMORY MATRIX

BACKGROUND OF THE INVENTION

1. Field of the Invention

This invention pertains to the field of coincident current magnetic core memory systems in which during read and write cycles half select currents are applied to both the bit and word lines.

2. Prior Art

The trend in magnetic core memory systems has been towards larger memory capacity and faster cycle time. In order to accomplish these objectives the core size has been substantially reduced. However, decreasing core size, increases the difficulty of threading the four wires of a cubic (3D) coincident current system through each of the cores. A fourth wire is usually necessary in a 3D system since an inhibit winding is required to separate the groups of cores into bit planes during the write back operation.

In order to provide a more favorable magnetic-to-electronic circuit balance of 2½D system has been designed which uses a maximum of three wires. This system preserves the decoding advantages of a 3D system but has some of the cost advantages of a planar (2D) linear select system. The 2½D system combines a coincident current read cycle and a linear select write cycle. Specifically, this system separates the groups of cores by providing separate current drivers in each bit plane with each bit plane comprising a group of bit lines. During the read cycle, a half select current is driven on a selected word line and a half select current is also driven on one bit line in each bit plane. In this manner, the selected cores are driven to the O state. Accordingly, in order to select the correct address of each bit wire within a bit plane or group, a selection is made of one bit wire out of a substantially small number of bit wires within a group. On the other hand, in the word wire axis one current driver may be efficiently steered to one of the substantially large number of word wires.

Accordingly, in prior 2½D systems while switching of the word wires is relatively efficient the switching of the bit wires is relatively inefficient as a substantially large number of switches are required to switch between the small number of bit wires in each bit wire group. Known matrices to provide such switching of bit wires may include a current driver and a diode matrix for each bit plane. The number of switches required in the diode matrix is equal to two times the square root of the number of points to be selected in each of the bit wire groups. Therefore, it will be understood that if a small number of points are to be selected within each group the number of switches per selection is a substantially high value. Accordingly, prior 2½D memory systems required a larger number of small selections to be made which resulted in a costly use of many switches.

A further disadvantage of prior 2½D memory systems has resulted since the current driver for the bit wires provides current in both directions. One current direction is selected for the direction of read current and the other direction for write current. A separate sense wire or third wire may be threaded through each of the cores and is connected to a sense amplifier to provide readout signals during the read operation. In order to provide noise cancellation the sense wires are generally transposed at regular intervals as they are threaded through the cores. Accordingly, as a result of the arbitrary direction of the read current in the bit lines and the transposition of the sense wires, the output signal applied to the sense amplifier may be in either one or the other direction depending on the location of the specific core being read out. Thus, each of the sense amplifiers is required to be bipolar; that is able to accept bidirectional signals. Such amplifiers are substantially more expensive than conventional unipolar amplifiers.

SUMMARY OF THE INVENTION

The memory system of the invention comprises first switching means for each group of bit wires and is operable for connecting a half select current source to a first end of all of the bit wires of the associated group. A plurality of conductor pairs are provided corresponding in number with the number of bit lines in a group. A second end of each bit line of a group is connected by way of unidirectional means to a differing one of the pairs of conductors so that each pair is associated with only one bit line of each group.

Second switching means is provided for each conductor pair and is operable for connecting either one but not both conductors of a pair to a point of reference potential. Each second switching means comprises a single switch or a common pair of switches, accordingly, each second switching means completes a path for flow of half select current through associated bit lines. During a read cycle all of the first switching means and a selected one of the second switching means are simultaneously actuated to provide flow of half select current only through bit lines associated with the selected second switching means. In addition, half select current is also supplied to a predetermined word line in a predetermined direction. When a half select current in a bit wire and a half select current in a word line coincide at a core, that core is switched to a O state if it were in a 1 state. Thus, in accordance with the invention, the required number of selections are made of the bit wires and the selections are made simultaneously in all bit wire groups with a substantial reduction in the number of switches required.

Further, in accordance with the invention, the direction of current flow through each of the bit wires during the read cycle is selected to produce a unipolar readout signal on each of the sense amplifiers. In this manner, unipolar amplifiers may be utilized instead of the more expensive bipolar amplifiers required by the prior art.

BRIEF DESCRIPTION OF THE DRAWINGS

Referring now to FIG. 1 there is shown a 12word, -word, core memory matrix having 12 horizontal rows and four vertical columns. While substantially larger matrices may be used, a 12-word matrix has been selected for purposes of explanation. Each row of cores 11 is threaded by a respective one of bit lines or wires 15—26. The bit wires are divided into groups or planes with three bit wires in each group or plane and each group corresponding to a differing bit position in a word. Thus, bit wires 15—17 correspond to the O bit position of a word; bit wires 18—20 correspond to the 1 bit position; bit wires 21—23 correspond to the 2 bit position; and bit wires 24—26 correspond to the 3 bit position.

Figure 1:
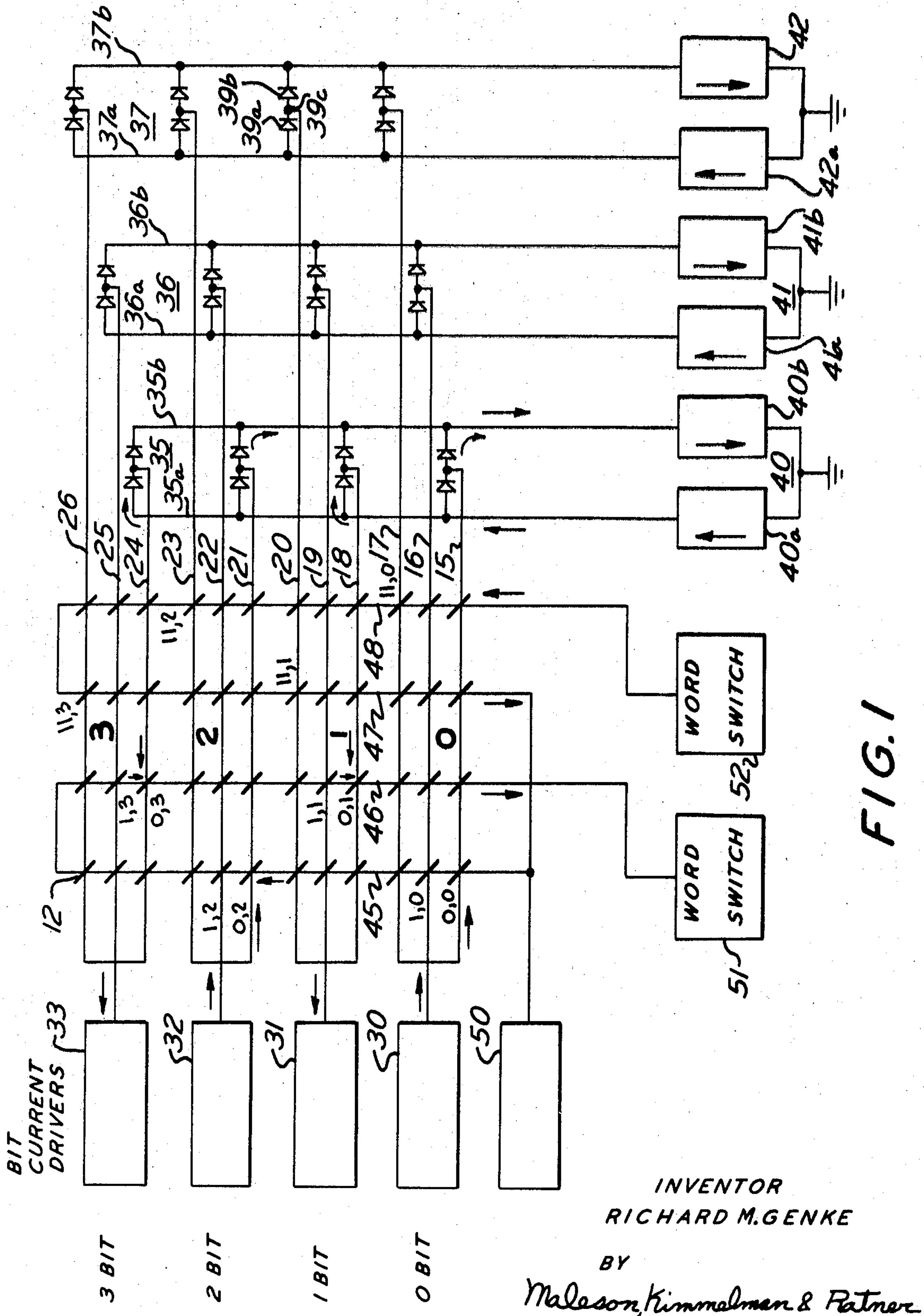
FIG. 1 illustrates in partial block diagram form a memory system embodying the invention.

Each of the bit wire groups has an individual source of bit current supplied by bit current drivers 30—33 (first switching means) which are connected to the left-hand end of bit wire groups 15—17, 18—20, 21—23 and 24—26, respectively. Each of the drivers 30—33 comprises a source of half select current and a switching circuit or first switching means later to be described in detail. These drivers are operable to provide a half select current in a predetermined direction and for the purposes of illustration drivers 30 and 32 are shown as supplying read current flow in the right-hand direction and drivers 31 and 33 are shown as supplying read current flow in the left-hand direction.

The right-hand end of each of the bit wires 15—26 is connected to one of three pairs of conductors or ladders 35—37 by way of diode pairs. Conductor pairs 35—37 correspond in number solely with the number of bit wires in a group, viz, three. More particularly, the right-hand end of each bit wire of each group is coupled to a differing one of the conductor pairs. Thus the first bit wire of each group viz, wires 15, 18, 21 and 24 are each connected to a common junction 39*c* of a differing pair of diodes 39 connected to conductor pair 35; the second bit wire of each group viz, wires 16, 19, 22 and 25, are each connected to a junction of a differing pair of diodes connected to conductor pair 36; and the third bit wire of each group viz, wires 17, 20, 23 and 26 are each connected to the common junction of a differing diode pair connected to conductor pair 37. In this manner, each conductor pair is associated with solely one bit wire of each bit wire group.

Each pair of diodes 39 is connected with the diodes in series circuit with the cathode of the left-hand diode 39*a* and the anode of the right-hand diode 39*b*, connected to a junction 39*c*. The anode of diode 39*a* is connected to the left-hand wire of a conductor pair and the cathode of diode 39*b* is connected to the right-hand wire of a conductor pair.

In order to complete a path for current flow in the bit wires 15—26 each of the conductor pairs 35—37 is connected by way of bit switches pairs 40—42 (second switching means) respectively, to a point of reference potential, viz ground. More particularly, the left-hand conductors 35*a*, 36*a* and 37*a* are connected to ground by way of bit switches 40*a*, 41*a* and 42*a*, respectively. These bit switches when actuated to a closed circuit position allow current to flow in an upward direction. The right-hand conductors 35*b*, 36*b* and 37*b* are connected to ground by way of bit switches 40*b*, 41*b* and 42*b*, respectively. These bit switches when actuated to a closed circuit position allow current to flow in a downward direction.

The selection logic of the computer actuates only one pair of bit switches at any one time thereby to connect the associated conductor pair to ground. Simultaneous with the bit switch actuation, the selection logic actuates all bit drivers 30—33. For example, the selection logic may actuate bit switch pair 40 to a closed circuit position and bit drivers 30—33 to supply half select current and thus current paths for half select current may be traced as follows. The 0 bit current driver 30 provides current in the illustrated right to left direction in the first bit wire 15 of the 0 bit group through a diode 39*b* and through the right-hand bit switch 40*b* to ground. Current flow for the 1 bit group may be traced from ground through bit switch 40*a*, a left-hand diode 39*a* and through bit wire 18 (first bit wire of 1 bit group) to the 1 bit current driver 31. The direction of flow for wire 21 of the 2 bit group is the same right to left direction as that of the 0 bit group and the direction of flow wire 24 of the 3 bit group is the same left to right direction as that of 1 bit group.

It will be understood that if the direction of current in each of the bit wires 15, 18, 21 and 24 is in the same direction than only one of the bit switches would carry four times the half select current. By half the currents being in one direction and the other half in the other direction, each of the bit switches handles two times the half select current. It will be understood that the typical system having 16 bits the 2 to 1 reduction in current handling capability of the switches is a very important criterion. It will be understood that bit switch pair 41 may be actuated simultaneously with drivers 30—33 and similar currents may be traced through bit wires 16, 19, 22 and 25. Further bit switch pair 42 may be actuated simultaneously with drivers 30—33 and similar currents may be traced through wires 17, 20, 23 and 26.

In conventional manner, starting from the left of FIG. 1 a first word wire threads the cores in the first column corresponding to word 0 and then extends through the second column of cores corresponding to word 1. In this manner the first word wire has a first half wire 45 in the column of word 0 and a second half wire 46 in the column of word 1. A second word wire has a first half wire 47 threaded through the third column corresponding to word 2 and a second half wire 48 extending through the cores in the fourth column corresponding to word 3. Thus, each word wire or line threads two cores on each bit wire. In an alternate arrangement the word wire halves may be disconnected so that each word wire only threads a single core on each bit wire.

Half select current in a predetermined direction determined by computer select logic is provided by a word current source 50 which supplies the current to the bottom end of wires 45 and 47. The bottom end of wire 46 is connected to a conventional word switch 51 and the bottom end of wire 48 is connected to a conventional word switch 52. It will be understood that in a matrix of typical size as for example 4,000 words, a separate diode matrix may be used to provide switching of half select currents to a predetermined word wire.

The operation of the memory system of FIG. 1 in a read cycle may be explained for example by describing the readout of cores associated with a first word. In the timing sequence for readout the computer selection logic simultaneously actuates (1) only bit switches 40 to the closed circuit position and (2) all of the drivers 30—33, thereby to supply current in the illustrated direction. Accordingly half select read current flows in first wires 15, 18, 21 and 24 of each group as previously described. As a result of this initial flow of half select read current, noise is generated on a sense wire later to be described with respect to FIG. 5 and thus a time delay is required before supplying word current. After such noise has decreased sufficiently, the computer selection logic actuates source 50 and word switch 51 to supply half select read current through the two half wires 45 and 46 of the first word wire in the direction illustrated. As a result current adds as shown in only the cores having addresses 0,0; 0,1; 0,2; and 0,3. The first number of the address indicates the word and the second number indicates the bit position. Since current adds only in these cores it is only these cores which have full drive current applied thereto in a direction to tend to switch these cores to the 0 state. Thus if any of these cores are in a 1 state then such cores are switched to a 0 state. On the other hand if any core is already in a 0 state it remains in a 0 state. Those cores which are switched from the 1 state to the 0 state produce a flux change which is coupled to the sense wire illustrated in FIG. 5 which produces the readout to the sense amplifier. Accordingly all of the cores are selected associated with all of the four bit positions of word 0.

For another example, word 11 may be read out by the computer selection logic which is effective to simultaneously actuate (1) only the pair of switches 42 associated with the third ladder and (2) all of the bit current drivers. Thus half select read currents flow in the illustrated directions through the third bit wires 17, 20, 23 and 26 of each group by way of the third conductor pair 37. After a time delay the computer selection logic actuates word current source 50 and word switch 52 to provide current flow through the two half wires 47 and 48 second word in the directions illustrated. Accordingly currents add in cores having addresses 11,0; 11,1; 11,2; and 11,3. In this manner full switching current is applied to the foregoing cores in a direction to tend to switch these cores to the 0 state. Accordingly all of the cores are selected associated with all of the bit positions of word 11.

It will now be understood in accordance with the invention only three pairs of bit switches, v.z., pairs 40—42 are required for all of the bit wires in addition to the four bit current drivers 30—33 to steer current through four different bit plane groups. In a similar matrix of the prior art there has been required a switch pair for each wire of each bit plane group to provide a total of 12 pairs of switches in addition to four drivers. In a typical prior large scale matrix, with 16 bit wires per group there has been required eight pairs of bit switches per bit plane and thus 64 pairs of bit switches for eight bit planes. In the present invention only 16 pairs of bit switches for the eight bit planes are required in which any number of bits may be in a bit plane. However, it will be understood that each bit switch of a pair is required to carry a half select current for each two bit planes while in prior systems each bit switch carries a half select current.

In the write cycle the computer selection logic is effective to operate bit current drivers 30—33 to provide half select current in a direction opposite to that illustrated in FIG. 1. However only those drivers are operated associated with cores which are to be driven to 1 state. In order to complete a circuit for flow of half select write current, the same pair of bit switches are actuated as were actuated for a desired word in the read cycle. In the previous example of readout of word 0 bit switch pair 40 has been actuated and this same pair is actuated for writing into word 0. Simultaneously with the actuation of the bit drivers and bit switches, the computer selection logic also actuates word current sources 50 and word switch 51 in a direction opposite to that illustrated for the read cycle. Accordingly with the direction of current in the bit wires and the word wires being opposite to that of the read cycle then full additive switching currents are applied to cores at addresses 0,0; 1,0; 2,0 and 3,0, if 1's are to be written into all of these cores.

Figure 2:
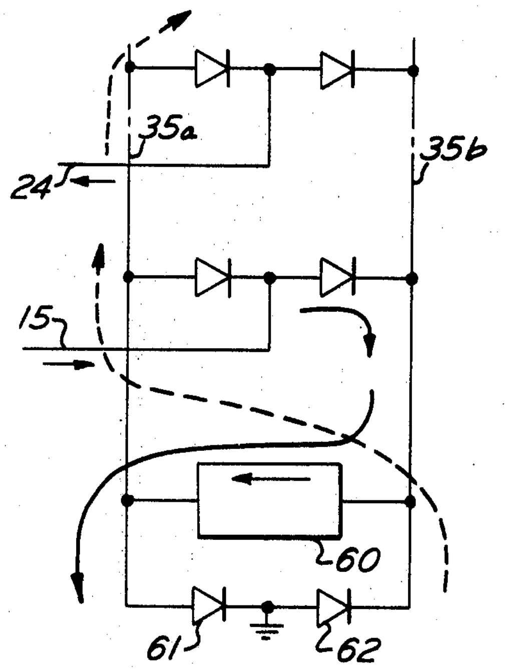
FIG. 2—2C illustrates another form of the invention.

The number of bit switches required by the system of FIG. 1 may be divided in half by using a single switch instead of a switch pair for each conductor pair in the manner illustrated in FIG. 2. A single bit switch 60 may be connected between a pair of conductors **35*a* and 35*b*. In FIG. 2, for purposes of illustration only two of the four bit wires associated with conductor pair 35 has been illustrated. A first diode 61 may be connected between the left-hand conductor 35*a* and ground by way of the anode and cathode thereof and the right-hand conductor 35*b* may be connected to ground by way of the cathode and anode of a second diode 62. Current flow through bit wire 15 may be traced in the direction of the solid-lined arrow, by way of conductor 35*b* through switch 60 and diode 61 to ground. Current flow through bit wire 24 may be traced from ground by way of diode 62 in the direction of the dotted line arrow and then through a diode 39*a* to wire 24. While only one-half the number of bit switches are required as compared with the system of FIG. 1, it will be understood that each of the bit switches is required to carry twice as much current as the bit switches of FIG. 1. Accordingly each of the bit switches of FIG. 2** is required to carry a half select current for each bit wire group.

Figure 2A:
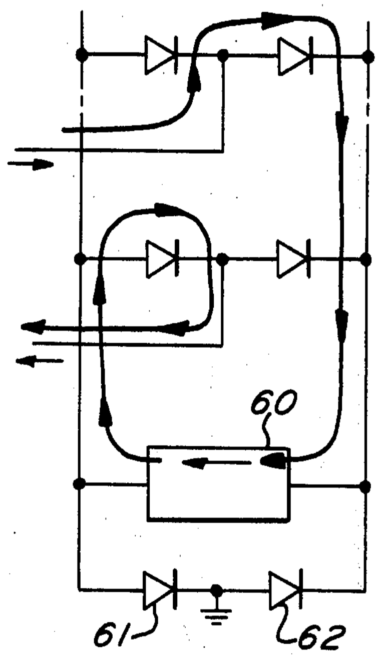
Figure 2B:
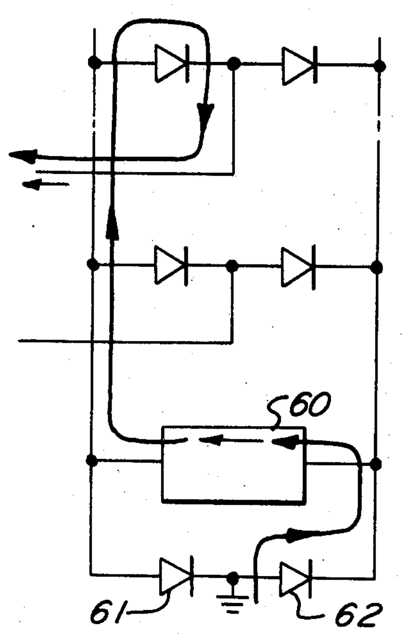
Figure 2C:
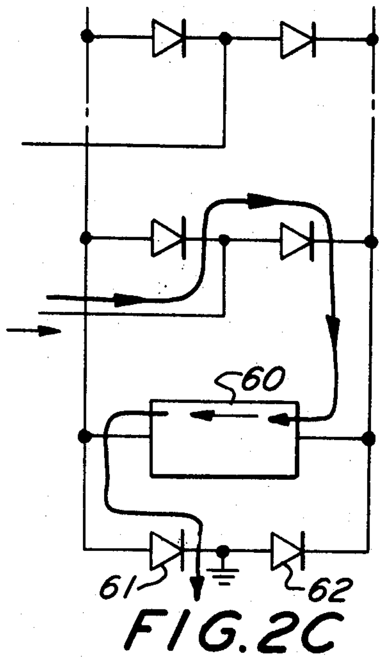

It has been assumed for the general description of FIG. 2 that the solid-line current and the dotted line current are different values since these currents may be generated by differing numbers of bit wires. However, if a number of bit wires provide current flow in one direction and an equal number of bit wires provide current flow in the opposite direction then a situation occurs which is illustrated in FIG. 2A. In this case there is an equal and opposite bit current flow which may occur during the read cycle for example. Current does not flow to ground but rather current flows from the bit wires providing current in the right-hand direction through switch 60 to the bit wires having current flow in the left-hand direction. Both ends of switch 60 are effectively at ground potential. Another situation may occur during the write cycle in which not all of bit current drivers 30—33 may be actuated which have current flow in the left-hand direction and thus a net current flow may be traced as illustrated in FIG. 2B. On the other hand, during a write cycle current flow may be in the illustrated direction of FIG. 2C thereby to provide a net current flow to ground.

Figure 3:
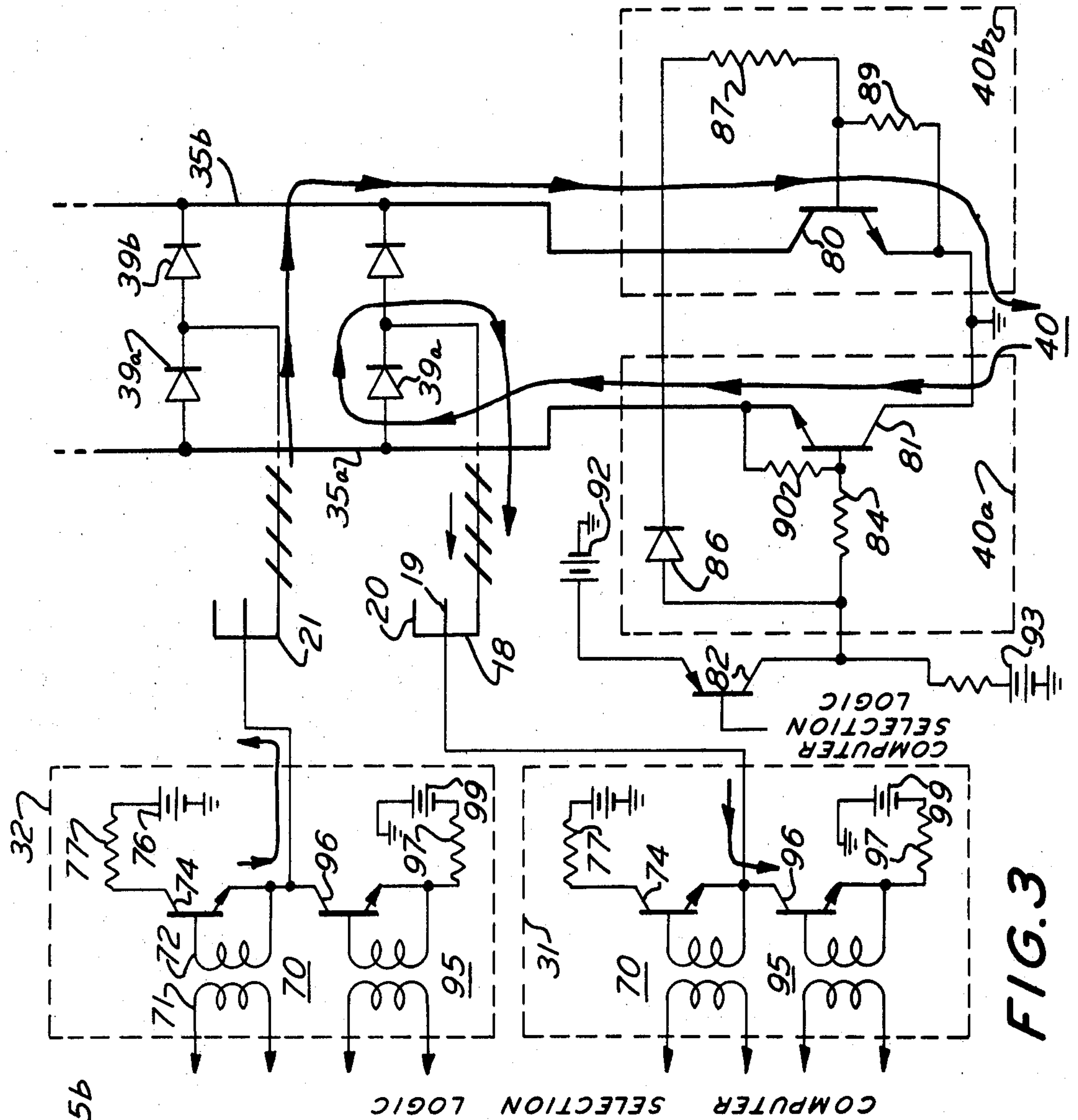
FIG. 3 illustrates in more detail some of the circuits shown in block diagram form in FIG. 1.

Coming now to FIG. 3 there is shown the circuit details of two of the bit current drivers 30—33 as for example drivers 31 and 32 and one of the pairs of bit switches 40—42 as for example switch pair 40. The drivers are of substantially identical construction and the bit switch pairs are of substantially identical construction and only the examples need be described in detail.

For driver 32 to produce current flow in the illustrated direction, the computer selections logic applies a signal to a primary winding 71 of an upper transformer 70 having a secondary winding 72 connected between the base and emitter of an NPN switching transistor 74. The signal is effective to turn on transistor 74 and half select current may be traced from a source such as the positive side of a battery 76 through a resistor 77, the collector, base and emitter of transistor 74 to the first bit wire 21 of the 2 bit group. In this manner half select current in the illustrated direction flows through wire 21 and then through a diode **39*b*, conductor 35*b* and then through the collector, base and emitter of turned on switching transistor 80 of bit switch 40*b* and then to ground. Transistors 80 and 81 may be of the NPN type and comprise the switching devices of bit switches 40*b* and 40*a*** respectively.

As previously described for the read cycle, simultaneous with the actuation of drivers 30—33, one of the bit switch pairs is actuated by the computer selection logic. Specifically a switching circuit for both bit switches **40*a* and 40*b* may be provided by an NPN switching transistor 82 the collector of which is connected by way of a resistor 84 to the base of switching transistor 81 of bit switch 40*a*. In addition the collector of transistor 82 is connected by way of a diode 86 and a resistor 87 to the base of transistor 80. Further, the base and emitter of each of the switching transistors 80 and 81 are each connected together by way of resistors 89 and 90** respectively.

Accordingly, with transistor 82 turned on, a positive-going signal is applied by way of the positive side of a battery 92 through the emitter base and collector of transistor 82 and to the bases of transistors 80 and 81 to turn on these transistors thereby to actuate switches **40*a* and 40*b* respectively. On the other hand when the computer selection logic turns off transistor 82, a negative-going signal is applied to the bases of transistors 80 and 81 from a battery 93 thereby to turn off these transistors. In this manner the bit switches 40*a* and 40*b* are directly coupled to a common input switching transistor 82. It will also be understood that switching transistors 80 and 81** may be switched by a transformer secondary with the primary thereof connected to the computer selection logic.

As previously described the computer selection logic is effective to actuate the upper transformer 70 of driver 32 and bit switch pair 40 to provide current flow in bit wire 21. Simultaneously the selection logic is effective to apply a signal to the lower transformer 95 of driver 31 to turn on NPN switching transistor 96 thereby to provide flow of half select current in bit wire 18 in the direction illustrated. Specifically current flow may be traced from ground through the collector, base and emitter of turned on transistor 81, conductor **35*a*, diode 39*a* bit wire 18 and through the collector, base and emitter of turned on transistor 96 and then through a resistor 97 to the negative side of a source of half select current 99**.

Resistors 77 and 97 are each selected to provide a desired magnitude of half select current. It will now be understood that the computer selection logic is effective to turn on only one of transistors 74 and 96 of a driver and thereby to effectively connect a source of half select current of predetermined direction to an end of all of the bit lines of the associated group. For example, for driver 31, either one of transistors 74 or 96 may be turned on, to effectively connect a source of half select current 77 or 97 respectively, to an end of all bit lines 18—20 of the 1 bit group. Since, only switch 40 has been actuated current actually flows only through wire 18.

Figure 4:
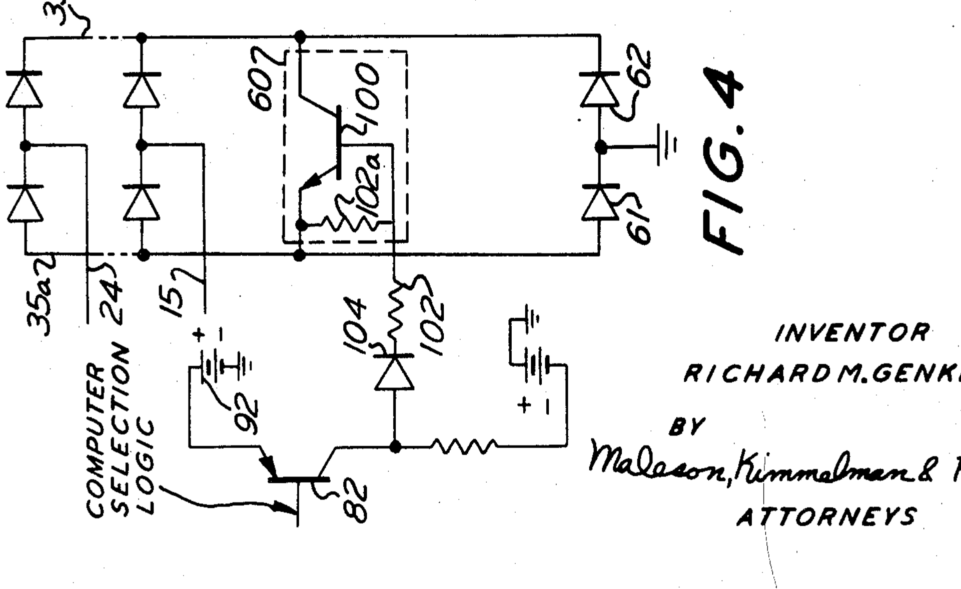
FIG. 4 illustrates in more detail the circuits of FIGS. 2—2C.
Figure 5:
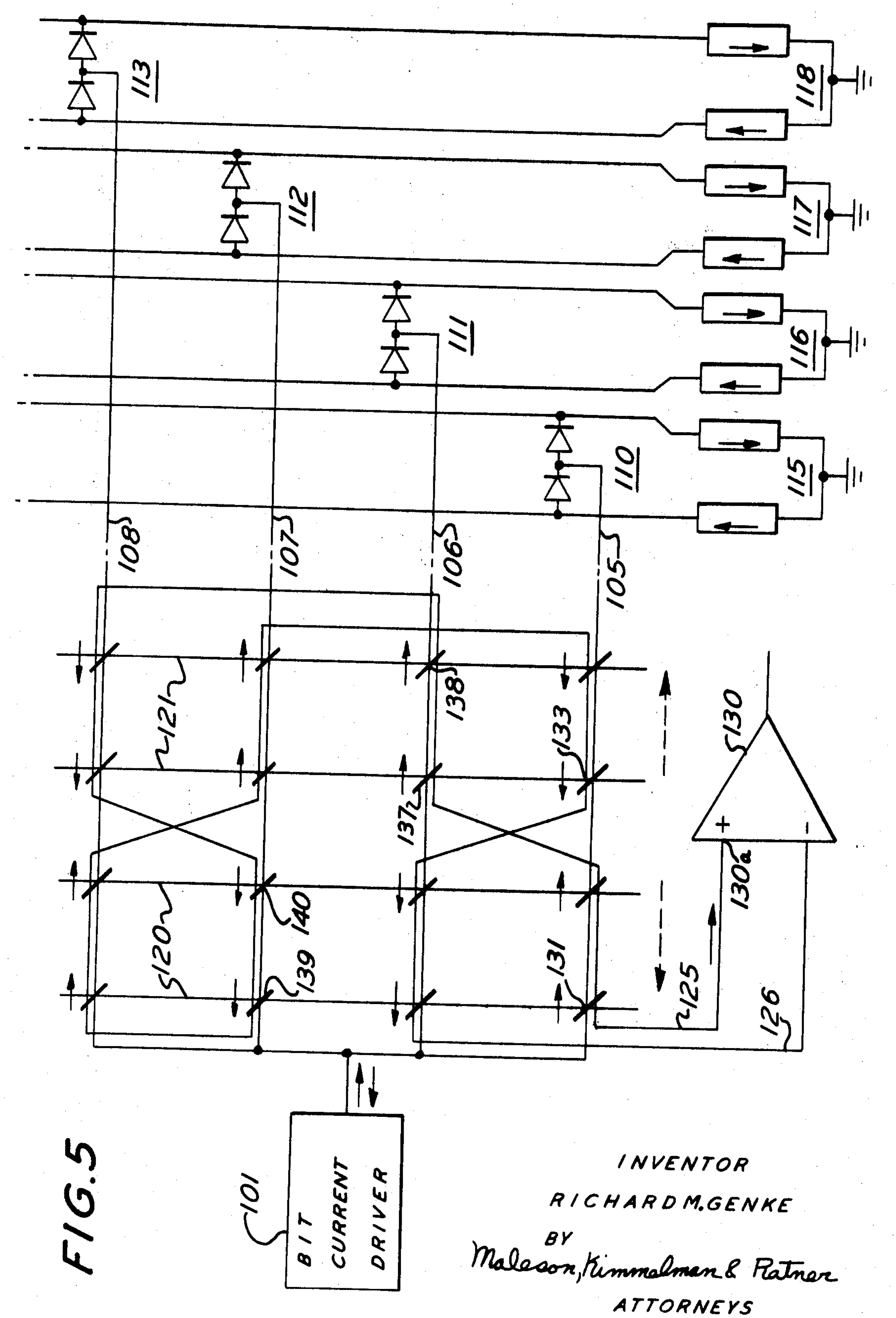
FIG. 5 illustrates another embodiment of the invention.

Referring now to FIG. 4 there is shown the circuit details of bit switch 60 of FIG. 2. Specifically bit switch 60 comprises a single NPN switching transistor 100 having its collector connected to right-hand conductor **35*b* of a conductor pair and its emitter connected to left-hand conductor 35*a*. The base of transistor 100 is connected by way of a resistor 102, a diode 104 to the collector of a switching transistor 82 of the type described above with respect to FIG. 3. In addition a bias resistor 102*a* is connected between the base and emitter of transistor 100. When the computer selection logic turns on transistor 82, a positive-going signal is applied by way of battery 92, diode 104, resistor 102 to turn on transistor 100. In this way, current is allowed to flow from right to left in the direction of the arrow through transistor 100 in the manner previously described in detail in FIGS. 2—2C. Referring now to FIG. 5 there is shown another embodiment of the invention in which for simplicity and explanation there has been illustrated only one of a plurality of bit wire groups, two word wires 120 and 121 and the 16 cores associated with those word wires and bit wire group. The illustrated bit wire group comprises four-bit wires 105—108 instead of a three-wire group illustrated in FIG. 1. It will be understood that many more word wires and bit wire groups may be provided. In accordance with the invention since the pairs of conductors or ladders are to correspond in number solely with the number of bit wires in a group, there are provided four conductor pairs 110—113 associated with bit wires 105—108, respectively. Conductor pairs 110—113 are connected by way of bit switch pairs 115—118**, respectively to ground. As the structure and operation of the ladders and bit switch pairs has previously been described a further explanation is not necessary.

In conventional manner a plurality of sense line pairs extend transversely with respect to the word wires and parallel to the bit wires. A differing sense line pair is provided for each bit group with each pair being threaded through each core in the associated group and being periodically transposed. In the example shown in FIG. 5 one of the plurality of sense line pairs is illustrated and comprises two wires 125 and 126 threaded through the illustrated cores. The two wires 125 and 126 are transposed at regular intervals in conventional manner thereby to reduce noise. Wires 125 and 126 are connected to the positive and negative terminals, respectively, of unipolar sense amplifier 130. It will be understood that any number of cores within the group may be so threaded with transposition of the sense wires at any regular interval.

A bit current driver is connected to one end of all bit lines 105—108. For the read cycle driver 101 conventionally only provides half select current in a single direction irrespective of the predetermined word wire being selected. Thus, half the cores would provide readout current in one direction through the wires 125 and 126 while the other half of the cores would provide readout current in the other direction. These different directions of sensed current through the sense line pair is caused by the periodic transposition of the 125 and 126 wires. As a result of such bidirectional current, prior sense amplifiers have been required to be bipolar which are substantially more expensive than conventional unipolar amplifiers.

In accordance with the invention for the read cycle the direction of a half select current through a selected bit wire is in the illustrated directions to provide flow of sense line current solely in one direction. Thus as individual words are readout of the memory the direction of current through the bit wires is selected to provide for unipolar readout. This predetermined direction of bit wire half select current is made possible by the bit current drivers operating in conjunction with the bit switches of the present invention which completes a path for flow of half select current in either direction.

For example referring to cores 131, with half select read current in bit wire 105 in the direction illustrated and half select current in word wire 120 in a proper direction, the readout sense line current is from right to left as illustrated by the dotted line arrow. Accordingly, current flows into the positive input terminal **130*a* of amplifier 130. With half select current flowing through bit wire 105 in the direction illustrated with respect to core 133 and half select current in word wire 121 in the proper direction, core 133 causes readout current to flow from left to right as illustrated by the dotted line arrow. In this manner readout current also flows into positive terminal 130*a*. The directions of half select current in the bit wires for all of the remaining cores may be similarly analyzed and it will be found that all the readout currents flow into the positive terminal 130*a* of amplifier 130** if the bit wire current flows in the directions illustrated.

From an examination of the direction of currents through bit wires 105 through 108 it will be seen that the bit current direction is the same for all cores associated with (1) the same bit wire and (2) between the same transpositions of wires 125 and 126. Thus cores 137 and 138 are both associated with the same bit wire, viz wire 106, and are between the same transpositions of the sense wires. Similarly cores 139 and 140 are both associated with wire 107 and are between the same transpositions. Thus the half select current through bit wire 106 when cores 137 and 138 are to be readout is selected to be in the same direction and the current through bit wire 107 when cores 139 and 140 are to be readout is selected to be in the same direction.

As previously described the bit current driver is actuated to control the direction of half select read current through the bit wires while the bit switches carry the current in either direction. Accordingly driver 101 may be actuated to connect a source of half select read current of predetermined direction to the left-hand end of all of bit wires 105—108 of that bit wire group. Specifically using the circuit for the drivers shown in FIG. 3 by turning on upper switching transistor 74, the positive side of a source of half select current 76 is connected to the bit wire group. On the other hand, by turning on the lower switching transistor 96 a negative source of half select current 99 is connected to the left-hand end of the bit wires.

In the manner previously described, with a proper direction of half select read current being supplied by driver 101, one of the bit switch pairs 115—118 is simultaneously actuated to provide for flow of current only through the bit line associated with the selected bit switch. Accordingly to obtain current flow in bit wire 105 in the direction illustrated for core 131, transistor 74 of driver 101 is turned on and bit switch pair 115 is actuated. On the other hand, to obtain the direction of current for core 133, transistor 96 is turned on and bit switch pair 115 is actuated. After a substantial time delay the driving means for a selected word wire is actuated to supply half select read current through a predetermined word line. Thus in accordance with the invention the computer selection logic is effective to control the bit current driver to provide current flow in selected bit lines in direction to produce unidirectional flow of sense line current in each sense line pair. It will be understood that the sense line pair is used only during the read cycle for readout of the selected cores. During the write cycle the output of the sense line pair is not used.

Those skilled in the art will understand how to select the values of the circuit components and also how to substitute for NPN transistors, transistors of opposite types such as PNP's and vice versa. With the above understanding of the invention, it will be readily understood that changes may be made in certain of the circuit arrangements some of which have already been suggested.

I claim:

1. A memory system comprising a core matrix divided into data words and data bits comprising said words:

a plurality of bit lines with each bit line threading cores representative of the same bit position in said words;

said bit lines being arranged in a plurality of groups with each of said groups including an equal number of bit lines;

first switching means for each group operable for connecting a source of half select current of predetermined direction to a first end of all of said bit lines of the associated group;

a plurality of word lines with each word line threading predetermined cores on said bit lines, driving means connected to said word lines operable for supplying a half select current for flow through a predetermined one of said word lines;

a plurality of pairs of conductors with said plurality corresponding in number solely with said number of bit lines in a group;

unidirectional means connecting a second end of each bit line of a group to a plurality of differing ones of said pairs of conductors whereby each pair is associated with solely 1 bit line of each group;

second switching means for each pair of conductors comprising a pair of bit switches operable for connecting both conductors of a pair to a point of reference potential to complete a path for flow of said half select current through the respective bit lines; and means for simultaneously actuating in the read cycle (1) all of said first switching means and (2) a selected one of said second switching means for providing flow of half select current only through bit lines associated with said selected second switching means and for actuating said driving means to supply half select current through a predetermined word line.

2. The memory system of claim 1 in which a first bit switch of said pair of bit switches is connected between a first conductor of an associated pair of conductors and said point of reference potential and a second bit switch of said pair of bit switches is connected between a second conductor of said conductor pair and said point of reference potential.

3. The memory system of claim 2 in which said first bit switch includes a first switching transistor and said second bit switch includes a second switching transistor, said first and second transistors each having an emitter, a base and a collector, said emitter of the first transistor and said collector of said second transistor being connected to the first and second conductors respectively, said collector of said first transistor and said emitter of said second transistor being connected to said point of reference potential.

4. The memory system of claim 3 in which each first switching means comprises a positive and a negative source of half select current, a first switching device being connected between said positive source and said first end of all of said bit lines of an associated group, a second switching device being connected between said negative source and said first end of all of said bit lines of said associated group, means connected to said first and said second switching devices for actuating said switching devices to connect either said positive or said negative source of half select current to said first end.

5. The memory system of claim 1 in which said actuating means in the write cycle simultaneously actuates (1) selected ones of said first switching means and (2) said selected one of said second switching means for providing flow of half select current in a reverse direction from that in said read cycle only through bit lines associated with said selected first and second switching means and for actuating said driving means to supply half select current in a reverse direction from that in said read cycle.

6. The memory system of claim 1 in which there is provided a sense line pair for each group of bit lines with each sense line pair being threaded through each core in the associated group and being periodically transposed, and said actuating means including means for controlling said first switching means to provide half select current flow in the selected bit lines in direction to provide unidirectional flow of sense line current in each sense line pair.

7. The memory system of claim 6 in which each sense line pair comprises two periodically transposed wires extending transversely with respect to said word lines and substantially parallel to said bit lines.

8. The memory system of claim 7 in which said direction of half select current flow in said selected bit lines in the same direction of all cores associated with the same bit line and between the same transpositions of said sense line pair wires.

9. A memory system comprising a core matrix divided into data words and data bits comprising said words:

a plurality of bit lines with each bit line threading cores representative of the same bit position in said words;

said bit lines being arranged in a plurality of groups with each of said groups including only bit lines corresponding to the same bit positions;

bit current driving means for each group operable for connecting a source of half select current of predetermined direction to a first end of all of said bit lines of the associated group;

a plurality of word lines with each word line threading at least one core on each of said bit lines, word driving means connected to said word lines operable for supplying a half select current in a predetermined direction for flow through a predetermined one of said word lines;

a plurality of ladder pairs of conductors with said plurality corresponding in number solely with said number of bit lines in a group;

diode means connecting a second end of each bit line of a group to a plurality of differing ones of said pairs of conductors whereby each pair is associated with solely one bit line of each group;

bit switching means for each pair of conductors comprising two switches operable for connecting both conductors of a conductor pair to a point of reference potential to complete a path for flow of said half select current in said predetermined direction through the respective bit lines between said source and said reference point; and means for simultaneously actuating in the read cycle (1) all of said bit current driving means and (2) a selected one of said bit switching means for providing flow of half select read current only through bit lines associated with said selected bit switching means and after a substantial time delay for then actuating said word driving means to supply half select read current through a predetermined word line whereby all cores are selected associated with all of the bit positions of a predetermined word.

10. The memory system of claim 9 in which said actuating means in the write cycle simultaneously actuates (1) selected ones of said bit current driving means and (2) said selected one of said bit switching means for providing flow of half select current in a reverse direction from that in said read cycle only through bit lines associated with said selected bit current and bit switching means and for actuating said word driving means to supply half select current in a reverse direction from that in said read cycle whereby selected cores are switched associated with selected bit positions of said word.

11. The memory system of claim 9 in which a first bit switch of said pair of bit switches being connected between a first conductor of an associated pair of conductors and said point of reference potential and a second bit switch of said pair of bit switches being connected between a second conductor of said conductor pair and said point of reference potential.

12. The memory system of claim 11 in which said first bit switch includes a first switching transistor and said second bit switch includes a second switching transistor, said first and second transistors each having an emitter, a base and a collector, said emitter of the first transistor and said collector of said second transistor being connected to said first and second conductors respectively, said collector of said first transistor and said emitter of said second transistor being connected to said point of reference potential.

13. The memory system of claim 12 in which there is provided a switching circuit for each pair of bit switches having an output connected to the base of each of said first and second switching transistors and in which an input of said switching circuit is connected to said actuating means.

14. The memory system of claim 12 in which each bit current driving means comprises a positive and a negative source of half select current, a first switching device being connected between said positive source and said first end of all of said bit lines of an associated group, a second switching device being connected between said negative source and said first end of all of said bit lines of said associated group, and transformer means connected to said first and said second switching devices for actuating said switching devices to connect either said positive or said negative source of half select current to said first end.

15. A memory system comprising a core matrix divided into data words and data bits comprising said words:

a plurality of bit lines with each bit line threading cores representative of the same bit position in said words;

said bit lines being arranged in a plurality of groups with each of said groups including an equal number of bit lines;

first switching means for each group operable for connecting a source of half select current of predetermined direction to a first end of all of said bit lines of the associated group;

a plurality of word lines with each word line threading predetermined cores on said bit lines, driving means connected to said word lines operable for supplying a half select current for flow through a predetermined one of said word lines;

a plurality of pairs of conductors with said plurality corresponding in number solely with said number of bit lines in a group;

unidirectional means connecting a second end of each bit line of a group to a plurality of differing ones of said pairs of conductors whereby each pair is associated with solely one bit line of each group;

second switching means for each pair of conductors comprising a single bit switch and a first and a second diode, said first bit switch being connected between an associated pair of conductors, said first diode being connected between a first conductor of said pair and said point of reference potential and said second diode being connected between a second conductor of said pair and said point of reference potential; and means for simultaneously actuating in the read cycle (1) all of said first switching means and (2) a selected one of said second switching means for providing flow of half select current only through bit lines associated with said selected second switching means and for actuating said driving means to supply half select current through a predetermined word line.

16. The memory system of claim 15 in which each bit switch includes a switching transistor having an emitter, a base and a collector, said emitter being connected to said first conductor and said collector being connected to said second conductor.